Nov. 9, 1965     H. J. STACEY     3,216,448
SPOOL VALVE ASSEMBLY
Filed Feb. 25, 1963

INVENTOR.
HUGH J. STACEY
BY
Oberlin, Maky & Donnelly
ATTORNEYS

United States Patent Office 3,216,448
Patented Nov. 9, 1965

3,216,448
SPOOL VALVE ASSEMBLY
Hugh J. Stacey, Chesterland, Ohio, assignor to Parker-Hannifin Corporation, Cleveland, Ohio, a corporation of Ohio
Filed Feb. 25, 1963, Ser. No. 260,561
4 Claims. (Cl. 137—596.2)

The present invention relates generally as indicated to a spool valve assembly, and more particularly, to a zero-leak assembly having cam-operated check valves downstream of the valve spool.

It is a principal object of this invention to provide a spool valve assembly of the character indicated which has a cam-operated pilot check valve which is disposed transversely of an axially reciprocating combination flow control and cam spool which, when moved in one direction, cams the pilot check valve member to unseated position to initiate return flow of fluid from a fluid motor to a reservoir whereupon the associated main check valve is opened by fluid pressure.

It is another object of this invention to provide a valve of the character indicated in which the pilot-operated check valve assembly is constructed so as to eliminate chattering or fluttering.

It is another object of this invention to provide a valve of the character indicated which provides, in addition to the usual neutral and operating positions to control a double acting fluid motor, an additional so-called "float" position in which two cam-operated pilot check valves are opened simultaneously to intercommunicate the fluid motor ports with each other and with the tank or reservoir.

It is another object of this invention to provide a valve of the character indicated which is capable of being installed with like valves in a fluid pressure system wherein it is desired to control the operation of a plurality of fluid motors from a single pressure source.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

Figure 1:
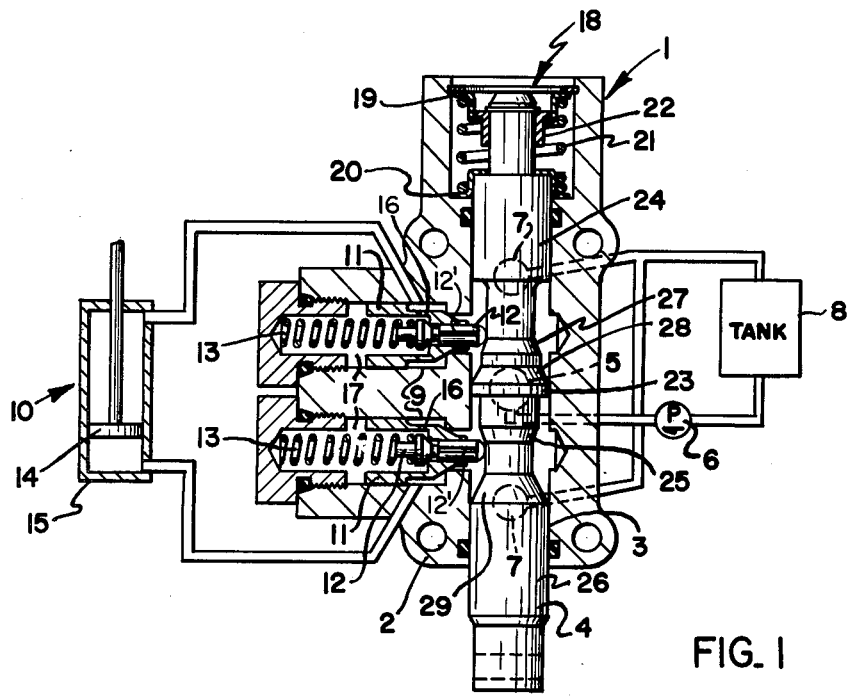
Figure 2:
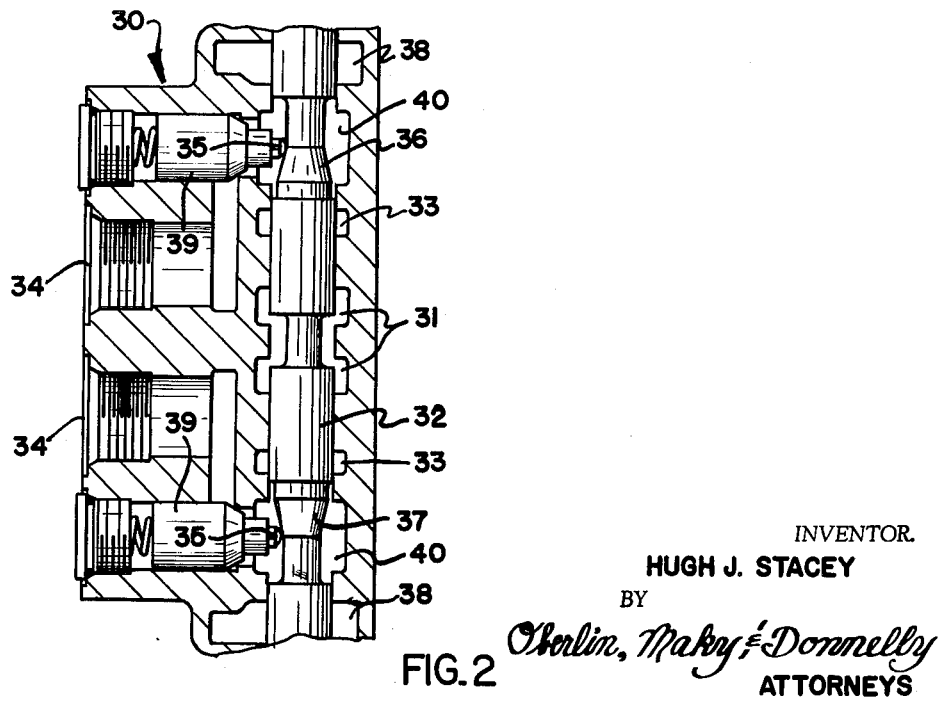

In said annexed drawings:

FIG. 1 is a longitudinal cross-section view of one embodiment of the present invention, such section having been taken in a plane passing through the axes of the cam spool and cam-operated pilot check valves; and FIG. 2 is a similar cross-section view of another embodiment of the present invention.

Referring now in detail to the drawing, and first to FIG. 1 thereof, the valve assembly 1 there shown comprises a housing 2 having a bore 3 in which a cam spool 4 is axially reciprocable, said bore 3 being intersected at axially spaced regions by an inlet port 5 which is in communication with the pressure delivery port of a pump 6 and by a pair of tank ports 7 which have communication with a tank or rservoir 8. Also intersecting said bore 3 on either side of the inlet port 5 is a pair of motor ports 9 which are adapted for connection with the ports of a double acting fluid motor 10.

Disposed in each motor port 9 is a main check valve member 11 having a pilot check valve member 12 seated therein by spring 13. The check valve member 11, in turn, through the same spring 13 is seated in the motor port 9 to block fluid communication of the respective motor port 9 with the spool bore 3 when the spool 4 is in neutral position as shown, thereby locking the piston 14 in the cylinder 15 in whatever position it happens to be. Each check valve member 11 has an orifice 16 therethrough leading from the respective motor port 9 to the respective chamber 17, and thus the check valve member 11 and pilot valve member 12 are held in seated position by spring pressure by fluid pressure in the chamber 17 acting on the areas of the respective pilot valve and check valve seats. In the neutral position of the cam spool 4, as shown in FIG. 1, the fluid delivered by the pump 6 is freely circulated to the reservoir 8 via the tank ports 7.

The cam spool 4 is held in the neutral position shown in FIG. 1 by a spring-centering mechanism 18 of familiar form associated with one end thereof and comprising, for example, opposed member 19 and 20 between which the spring 21 is compressed upon movement of the spool 4 upwardly or downwardly from the neutral position shown. Telescoped in the upper member 19 is another sleeve member 22 which allows a greater upstroke than downstroke for a purpose to be described.

When the spool 4 is moved downwardly from neutral position, the land 23 closes communication between the inlet port 5 and the lower motor port 9 and lower tank port 7, and the land 24 blocks the upper tank port 7 so that fluid under pressure delivered by the pump 6 in acting on the upper pilot operated check valve 11 unseats the latter to conduct fluid under pressure to act on the rod end of the piston 14 to urge the same downwardly in the cylinder 15. When the spool 4 is thus moved downwardly, the cam 25 thereof unseats the lower pilot valve member 12 to bleed the chamber 17 to the tank 8 via bleed passages 12' defined between the inner end of the main check valve member 11 and the pilot chack valve member 12. Since the flow capacity of such bleed passages is greater than the flow capacity of the restriction 16, there is a decrease in pressure in the chamber 17 to a lower value than in the motor port 9, whereupon the greater prersure in the motor port 9 forces the check valve member 11 away from its seat for return of the displaced fluid from the head end of the cylinder 15 to the tank 8 via the intercommunicating lower motor and lower tank ports 9 and 7. It is to be noted that the cam 25 can be operated to throttle the return flow thus to move the piston 14 at a desired rate of speed and, furthermore, the orifices 16 in check valve members 11 make the chambers 17 cushioning or dashpot chambers to thereby eliminate chattering or fluttering.

On the other hand, when the cam spool 4 is moved upwardly to the other operating position, the land 23 closes communication between the inlet port 5 and the upper motor port 9, and the land 24 opens communication between the upper motor port 9 and the upper tank port 7. At the same time, the land 26 covers the lower tank port 7 so that fluid under pressure building up in the inlet port 5 unseats the lower check valve assembly 11–12 for flow of fluid under pressure into the head end of the cylinder 15, and the cam 27 unseats the pilot valve member 12 of the upper check valve assembly for flow of displaced fluid from the rod end of the cylinder 15 to the tank 8 via the uper tank port 7, the upper check valve assembly 11–12 operating in the same manner as previously described in relation to the lower check valve assembly.

The valve shown in FIG. 1 has yet another operating position, that is, a so-called "float" position, which is effected by further upward movement of the cam spool 4 whereat the cams 28 and 29 unseat both pilot valves 12 and the land 23 uncovers the upper motor port 9 so that the motor ports 9 are in fluid communication with each other. Therefore, the piston 14 can float in either direction with excess fluid displaced from the head end of cylinder 15 being returned to the tank 8 via the upper tank port 7 which is now uncovered by the land 24, or make-up fluid, to keep the head end of the cylinder filled, flows from the pump 6 and also from the upper tank port 7 past the uncovered upper motor port 9.

As evident from FIG. 1, there is a substantial increase in resistance to the movement of the spool 4 from the second operating position to this float position, since the relatively steep angle configuration of the cams 28 and 29 as compared to the angle of the cams 25 and 27 is effective to compress the springs 13 at a much faster rate than do the cams 25 and 27. Also, additional resistance to such further movement of the spool is encountered due to the fact that two check valve springs 13 are compressed instead of the usual one, and to a greater extent due to the configuration of the actuating cams 28 and 29 and the increased movement of the spool 4 in the up direction. Moreover, the centering spring 21 is likewise compressed to a greater extent because of such increased spool movement. Accordingly, when a pronounced increase in resistance is encountered during upward movement of the spool 4, it acts as a sensory indicator to the operator that the spool is being moved from the usual second operating position to the float position.

It is to be noted that the check valve assemblies 11-12 prevent back flow of fluid (or load dropping) from the motor ports 9 in the inlet port 5.

The valve assembly 30 shown in FIG. 2 is of the four-way open center type which has the advantage that two or more valve assemblies 30 may be joined together or banked for operation from a single fluid pressure source to control operation of a corresponding number of fluid motors. In FIG. 2, the reference numeral 31 denotes a central bypass passage which bypasses the pump output to the tank in known manner when the cam spool 32 is in the neutral position shown. As also well known, when the spool 32 is shifted either upwardly or downwardly from the neutral position, the bypass passage 31 will be blocked, whereby fluid under pressure builds up in one or the other of the pressure feed passages 33 for flow to the associated motor port 34. With the spool 32 in such shifted position, the other motor port 34 has its pilot valve member 35 unseated by the associated cam 36 or 37 in the same manner that the other pilot valve member 12 of the FIG. 1 embodiment is unseated for return flow of fluid as described previously from said other motor port 34 to the tank port 38 then in communication therewith. Accordingly, the valve assembly 30 of FIG. 2 provides for actuation of the piston of a double acting fluid motor in opposite directions. It is to be understood that when it is desired to actuate a single acting fluid motor one of the motor ports 34 may be plugged and one of the pilot operated check valve assemblies 35-39 may likewise be omitted together with the actuating portions of the spool 32. Assuming that the upper motor port 34 is plugged and the upper check valve assembly 35-39 is omitted, it will be seen that in the neutral position, the piston and its load will be held by the fluid trapped between the cylinder and the lower check valve assembly 35-39. When it is desired to lower the piston under the influence of the load thereon, the spool 32 will be shifted downwardly whereby the cam 37 will unseat the pilot valve member 35 followed by opening of the check valve member 39, in a manner already described in detail, for return flow of fluid to a tank via the lower motor port 34 and lower tank port 38. On the other hand, when it is desired to raise the piston and its load, the spool 32 will be shifted upwardly from neutral position, whereby fluid under pressure building up in the lower pressure feed passage 33 and lower motor port chamber 40 will unseat the check valve assembly 35-39 for flow of fluid under pressure into the cylinder via the lower motor port 34.

Other modes of applying the principle of the invention may be employed, change being made as regards the details described, provided the features stated in any of the following claims, or the equivalent of such, be employed.

I therefore particularly point out and distinctly claim as my invention:

1. A valve assembly comprising a housing having a bore intersected axially therealong by an inlet port for connection with a fluid pressure source, a pair of motor ports for connection with a double-acting fluid motor, and a tank port for connection with a tank; a valve spool reciprocable in said bore selectively to communicate said inlet port with one of said motor ports, and said tank port with the other of said motor ports; a main check valve means in each motor port opened by fluid pressure when that motor port is communicated with said inlet port, a pilot check valve means in each main check valve means having a portion thereof extending laterally into said bore; spring means biasing the respective pilot check valve means and the associated main check valve means toward their closed positions; said spool having a pair of cam means selectively to open the pilot check valve means which is associated with that motor port which is communicated with said tank port by movement of said spool as aforesaid; said main and pilot check valve means defining with said housing, chamber means which has restricted communication with the respective motor ports and which is vented to said tank port by opening of the respective pilot check valve means whereby predominating fluid pressure is established in the associated motor port; said main check valve means being adapted to be opened by such predominating fluid pressure for additional flow of fluid from said motor port to sand tank port; said spool having another cam means effective, upon further movement of said spool, to open both pilot check valve means and to communicate both motor ports directly with each other and with said tank port, whereby the piston of a double-acting fluid motor may move in either direction under the influence of a load thereon.

2. The valve assembly of claim 1 wherein said housing has a bypass passage means communicating said inlet port with said tank port when said spool is in neutral position blocking communication between said motor ports and said inlet and tank ports, whereby said housing may be provided with plural spools for actuation of a plurality of fluid motors with a single fluid pressure source connected with said inlet port.

3. The valve assembly of claim 1 wherein said another cam means are operative to provide pronounced change in resistance to such further movement of said spool for sensory indication of movement beyond the usual movement of said spool selectively communicating said inlet port with one of said motor ports and said tank port with the other of said motor ports.

4. The valve assembly of claim 3 wherein the angle of inclination of said another cam means is much steeper than the angle of inclination of said pair of cam means.

References Cited by the Examiner

UNITED STATES PATENTS

| 2,572,705 | 10/51 | Edman | 137—636.1 |
| 2,592,906 | 4/52 | Jirsa et al. | 137—637.1 |
| 2,612,375 | 9/52 | Worthington | 137—637.1 |
| 2,644,429 | 7/53 | Waterman et al. | 137—612.1 |
| 2,679,263 | 5/54 | Kiser et al. | 137—596.13 |
| 3,125,120 | 3/64 | Hasbany | 137—596.12 |

M. CARY NELSON, *Primary Examiner.*